United States Patent [19]
Staschke et al.

[11] 3,712,052
[45] Jan. 23, 1973

[54] THERMAL ACTUATOR WITH CAPTIVE PISTON SHAFT AND SPECIAL SEAL

[75] Inventors: Marvin A. Staschke, Glendora; Henry Kryczko, Upland, both of Calif.

[73] Assignee: Thermal Hydraulics Corporation, Glendora, Calif.

[22] Filed: April 1, 1971

[21] Appl. No.: 130,175

[52] U.S. Cl. ................................................ 60/23
[51] Int. Cl. .............................................. F03g 7/06
[58] Field of Search ..... 60/23; 251/11; 236/100, 101; 73/368.2, 368.3

[56] References Cited

UNITED STATES PATENTS

| | | | |
|---|---|---|---|
| 3,166,892 | 1/1965 | Sherwood | 60/23 |
| 3,469,504 | 9/1969 | Neighorn | 92/85 |

Primary Examiner—Martin P. Schwadron
Assistant Examiner—Allen M. Ostrager
Attorney—Bertha L. MacGregor

[57] ABSTRACT

A thermal actuator comprising a pressure chamber, expansible material responsive to heat in the chamber, and a piston shaft driven by the expansible material, the shaft being slidable in a bearing in the actuator housing and having an enlarged inner end which prevents complete ejection from the actuator by becoming embedded in the bearing in the event the shaft is expelled from the pressure chamber due to excessive pressure resulting from conversion of the expansible material from its liquid state to a gaseous condition by overheating. The piston shaft is slidable through a seal and polyethylene washer bearing on the pressure chamber side of the seal, said washer gradually coming into solution with and increasing the viscosity of the expansible material in the normal operation of the actuator.

7 Claims, 4 Drawing Figures

PATENTED JAN 23 1973

3,712,052

INVENTOR.
MARVIN A. STASCHKE
HENRY KRYCZKO
BY Bertha L. MacGregor
ATTORNEY

THERMAL ACTUATOR WITH CAPTIVE PISTON SHAFT AND SPECIAL SEAL

This invention relates to a thermal actuator provided with a captive piston shaft and special seal for the shaft.

Paraffin and other waxes are used in thermal actuators to serve as expansible material for actuating piston shafts when subjected to heat. In the normal use of thermal actuators for their intended purposes, the expansible material when subjected to heat is altered from a solid state to a liquid state, and returns to its solid condition when cool. When such expansible material is overheated, the liquid state is converted to a gaseous condition which is irreversible. Overheating may occur in thermal actuators by applying excessive voltage to the heating element of the actuator, or if the actuator is used under conditions where the connecting electrical wires are exposed to the elements, by an induced voltage due to lightning. When such overheating occurs in a thermal actuator in which the expansible material drives a piston shaft, excessive pressure is generated in the gaseous material and substantial force and velocity are imparted to the piston shaft which causes the shaft to be ejected forcibly from the actuator and to cause physical injury.

One of the objects of this invention is to prevent ejection of the piston shaft from the actuator. This object is achieved by providing the piston shaft with an enlarged or flared inner end which becomes embedded in the piston shaft bearing and holds the shaft "captive" so that it cannot be expelled from the actuator housing.

Another object of the invention is to provide a special seal in the actuator through which the piston shaft is slidable, the seal being designed to retain the expansible material in the high pressure chamber in the actuator housing and to prevent loss of pressure and expansible material. Wax in its liquid state has very low viscosity which makes it difficult to seal the expansible material under high pressures. Polyethylene has very high viscosity when in its liquid state, and is compatible with waxes. For these reasons, I have applied a polyethylene washer to the pressure chamber side of the "Celcon" seal heretofore used in thermal actuators. When the polyethylene melts into solution with the wax, the solution has a substantially higher viscosity than the wax alone, which greatly improves the sealing quality of the piston seal, thereby extending the cycle life of the actuator. The combining of the polyethylene and wax in solution in the pressure chamber occurs gradually during normal operations of the actuator. Before the polyethylene washer goes into solution, it serves as part of the existing piston shaft seal, and after it has passed into solution with the expansible material it enhances the viscosity of the solution and improves the sealing function of the seal.

Figure 1:
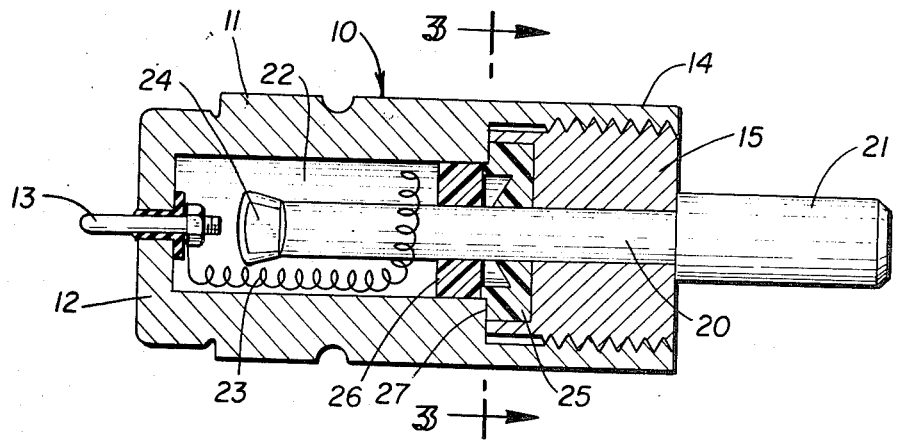
FIG. 1 is a longitudinal sectional view, partly in elevation, of a thermal actuator embodying my invention, showing the piston shaft in retracted position, and showing my special piston shaft seal.
Figure 2:
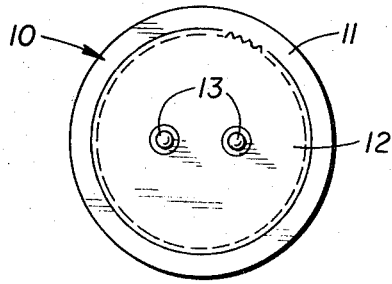
FIG. 2 is an elevational view showing the left end of the actuator shown in FIG. 1.
Figure 3:
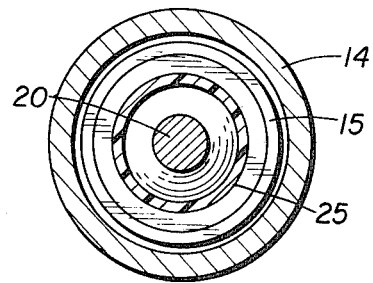
FIG. 3 is a transverse sectional view in the plane of the line 3—3 of FIG. 1.

In the embodiment of the invention shown in the drawings, the thermal actuator 10 comprises a high pressure housing 11, generally cylindrical in form, provided with a closed end 12 through which electrodes 13 extend for connection to a source of electrical current (not shown). The open opposite end portion 14 of the actuator housing 11 is internally threaded to receive the threaded bearing 15 provided with a central bore for slidably receiving the piston shaft 20 which may have an enlarged or capped end portion 21 for contacting the work (not shown) such as a valve, damper, shutter, or the like to be actuated by the shaft 20.

Within the housing 11 is a pressure chamber 22 containing expansible material such as paraffin wax or other suitable expansible material (not shown) heated by the heating element 23 which is located in the housing chamber in such position that it does not obstruct movement of the piston 20. The inner end of the piston 20 is flared or enlarged as indicated at 24. The uniform diameter portion of the shaft 20, between the flared end 24 and the work abutting end portion 21, is slidable in the seal 25 and washer 26. The seal 25 may be made of any suitable sealing material, of which "Celcon" is an example, and fits tightly within the recessed part of the bearing 15, abutting against the shoulder 27 at the end of the smaller diameter part of the housing 11. The washer 26 fits tightly in the housing 11 and against the seal 25 as shown in FIG. 1.

Figure 4:
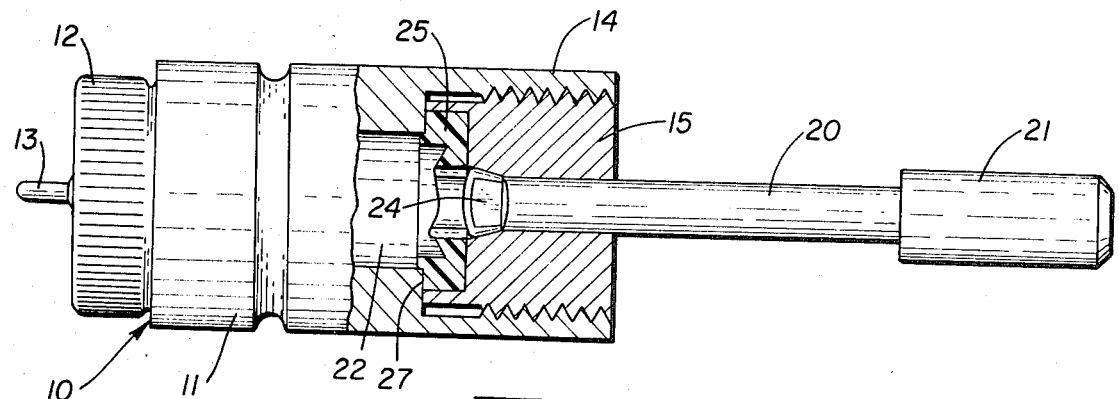
FIG. 4 is an elevational view, partly in section, showing the actuator piston shaft in "captive" position after having been forcibly ejected from the pressure chamber due to overheating of the expansible material in the actuator, the washer of the special seal having become dissolved.

The washer 26 is made of polyethylene or other compound which when melted into solution with the expansible material increases the viscosity of paraffin and other waxes which may be employed as the expansible material in a thermal actuator. The washer 26 of polyethylene gradually dissolves during operation of the actuator into the expansible material (not shown) in the pressure chamber 22, leaving the conventional seal 25 as shown in FIG. 4 after dissolution of the washer 26. The sealing function of the seal 25 is improved by the higher viscosity of the expansible material after dissolution of the polyethylene washer 26.

In the event the piston shaft 20 has been forced into the "captive" position of FIG. 4 by overheating of the expansible material and resultant conversion into a gaseous state in the pressure chamber 22, the actuator can be disassembled and the parts restored to the FIG. 1 condition without danger of injury caused by complete ejection of the shaft 20.

The feature that makes the unit safe for handling and/or disassembly is that the gas pressure generated internally is vented through the clearance between the shaft (20) and the guide hole in bearing (15) after the flange (24) has passed through the seal (25) thereby allowing the internal pressure to escape.

I claim:

1. A thermal actuator comprising
   a. a high pressure housing having a pressure chamber and a heating element therein,
   b. expansible material responsive to heat in the chamber, said material being convertible to gaseous state by overheating,
   c. a bearing fixedly mounted in the housing,
   d. a seal adjacent the bearing, and e. a piston shaft slidable in the bearing, said shaft having an inner end flared sidewise in opposite directions which ruptures the seal and becomes embedded in and is held captive in the bearing and vents the internal pressure between the shaft and the bearing hole in the event the shaft is expelled from the pressure chamber by overheating of the expansible material, whereby complete ejection of the shaft from the actuator is prevented.

2. A thermal actuator comprising
a. a high pressure housing having a pressure chamber and a heating element therein,
b. expansible material responsive to heat in the chamber, said material being convertible to gaseous state by overheating,
c. a bearing fixedly mounted in the housing,
d. a piston shaft slidable in the bearing, said shaft having an enlarged inner end in the pressure chamber which becomes embedded in and is held captive in the bearing in the event the shaft is expelled from the pressure chamber by overheating of the expansible material, whereby complete ejection of the shaft from the actuator is prevented, and
e. a seal and a washer surrounding the piston shaft, the washer being located on the pressure chamber side of the seal and soluble in the expansible material when heated to increase the viscosity of the solution and the sealing capacity of the seal.

3. The actuator defined by claim 2, in which the washer is made of polyethylene.

4. The actuator defined by claim 2, in which the seal is located in a recess in the bearing and contacts a shoulder formed in the housing adjacent the end of the pressure chamber.

5. The actuator defined by claim 4, in which the washer is fitted tightly in the pressure chamber end of the housing adjacent the seal.

6. A thermal actuator comprising
a. a high pressure housing having a pressure chamber and a heating element therein,
b. expansible material responsive to heat in the chamber,
c. a bearing fixedly mounted in the housing,
d. a piston shaft slidable in the bearing,
e. a seal surrounding the shaft between the bearing and pressure chamber, and
f. a washer adjacent the seal made of material soluble in the expansible material when subjected to heat and having high viscosity when melted which increases the viscosity of the solution and sealing capacity of the seal.

7. The thermal actuator defined by claim 6 in which the washer is made of polyethylene.

* * * * *